Jan. 5, 1926. 1,568,738
M. D. JONES
PROCESS OF DRYING MATERIALS
Filed March 18, 1924 3 Sheets-Sheet 1

INVENTOR
Michael D. Jones
BY
Pennie, Davis, Marvin & Edmonds
his ATTORNEYS

Jan. 5, 1926.
M. D. JONES
1,568,738
PROCESS OF DRYING MATERIALS
Filed March 18, 1924
3 Sheets-Sheet 2
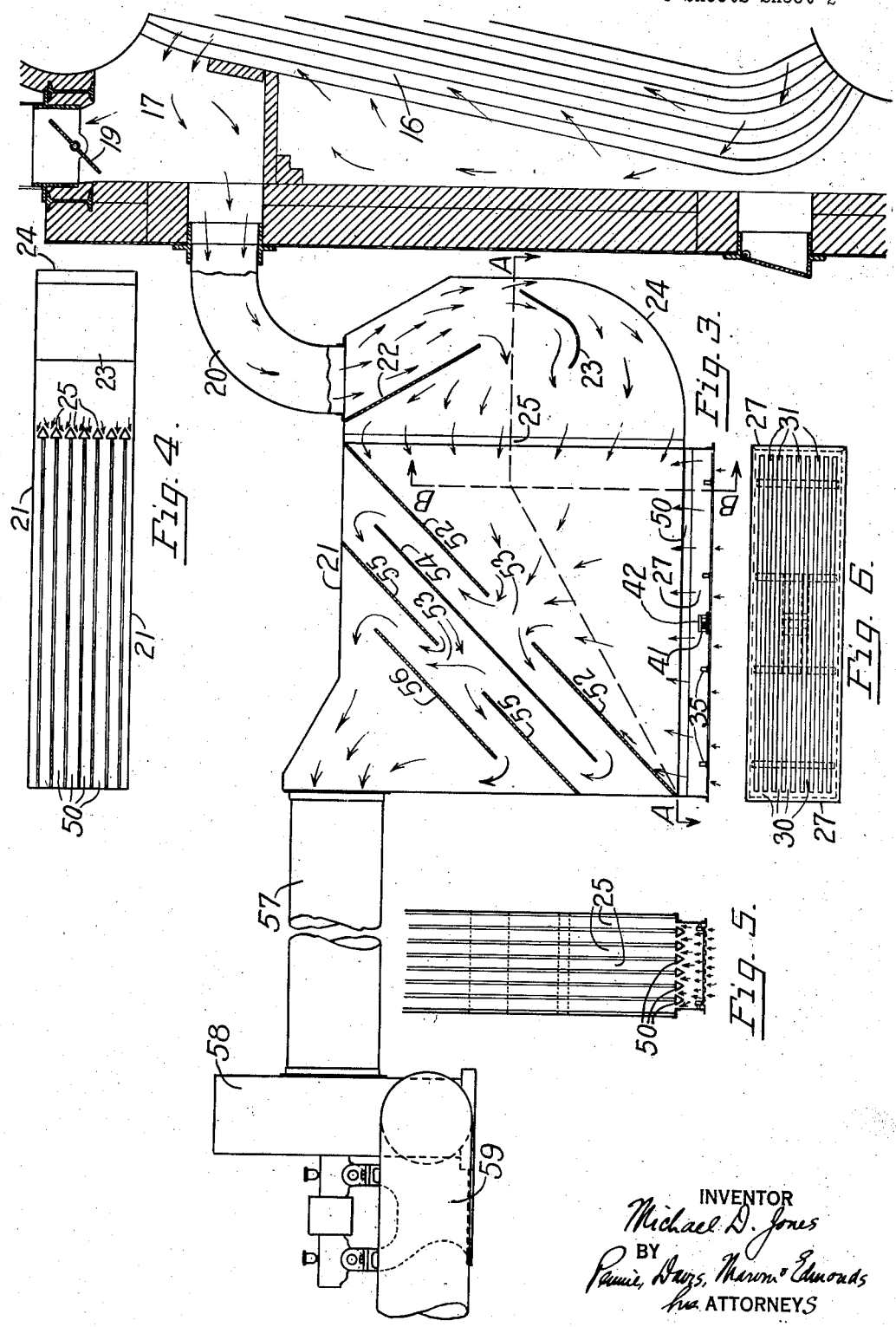

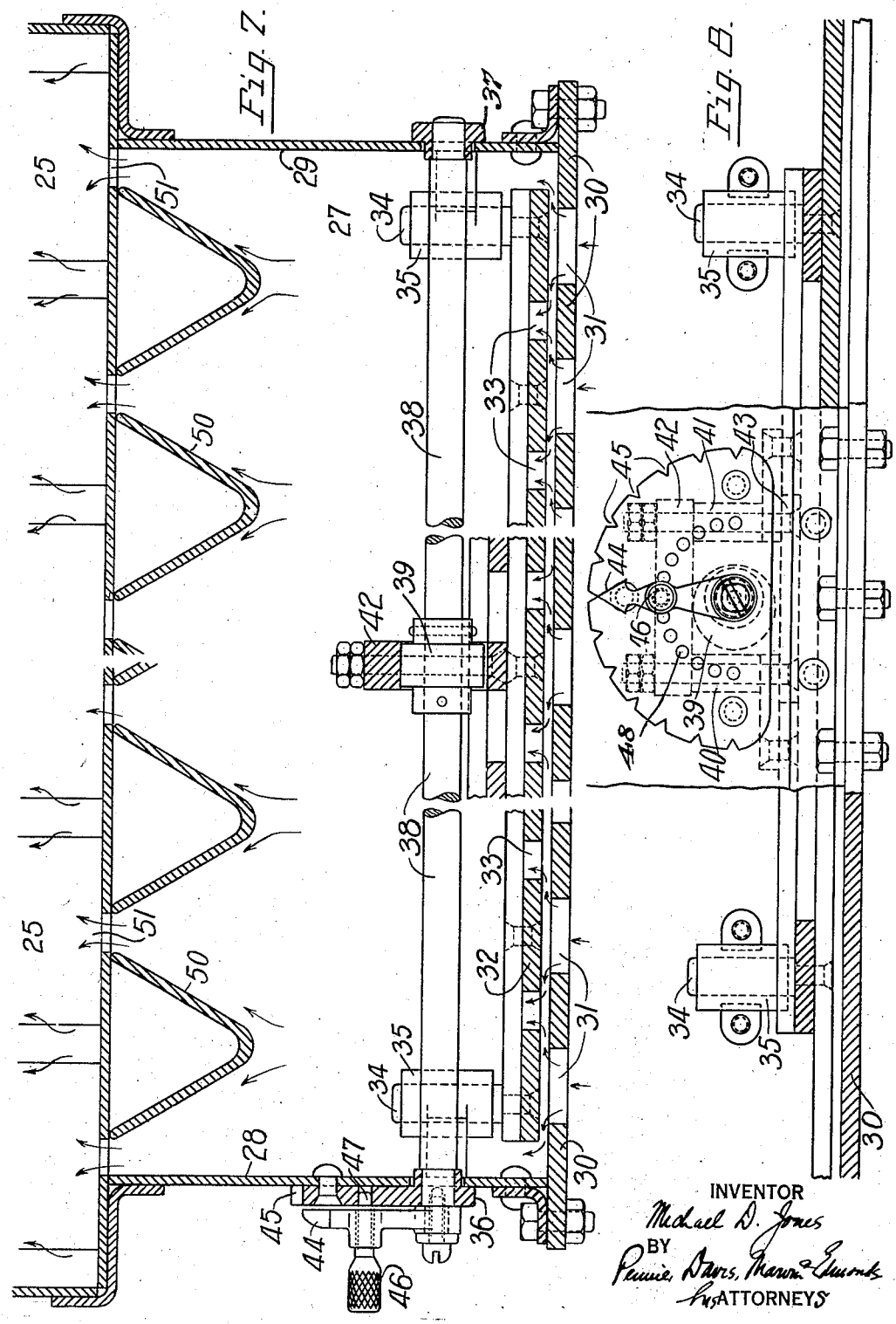

Patented Jan. 5, 1926.

1,568,738

UNITED STATES PATENT OFFICE.

MICHAEL DOLAND JONES, OF ALLENTOWN, PENNSYLVANIA, ASSIGNOR TO FULLER FUEL COMPANY, A CORPORATION OF PENNSYLVANIA.

PROCESS OF DRYING MATERIALS.

Application filed March 18, 1924. Serial No. 700,174.

*To all whom it may concern:*

Be it known that I, MICHAEL DOLAND JONES, a citizen of the United States, and a resident of Allentown, in the county of Lehigh and State of Pennsylvania, have invented a new and useful Process of Drying Materials, of which the following is a full, clear, and exact description.

This invention relates to a process for drying materials, which is of especial advantage for drying substances of a combustible character, such as fuels, by the utilization of the sensible heat of gases of combustion from other processes. More particularly, this improved process is intended to be employed in the drying of coal which is to be pulverized and burned in the pulverulent condition, the waste gases from the furnace providing the necessary heat for the drying operation. The following description relating to this adaptation of the process is to be understood as illustrative merely of one typical use of the process, which is capable of general utility.

Attempts have been made heretofore to operate processes for combustible materials in which waste gaseous products of combustion from other processes have been used as the source of heat, but these attempts have not been wholly successful. On the contrary, it has been found that the material to be dried frequently ignites in certain parts of the drier, while in other parts, the moisture content, instead of being diminished, is actually increased. Even if ignition does not take place, the material discharged from the drier is variable as to dryness, and may be said to be streaked with moisture. When such material is coal which is to be pulverized, the presence of this moisture causes serious difficulties in the pulverizing operation.

In vertical driers, through which the material passes by gravity, it is often found that the use of waste gases of combustion as a heating medium results frequently in a transfer of heat to the material at one side of the drier, rapidly raising its temperature to the point of ignition, while in the other side of the drier, a transfer of moisture to the material occurs, thus increasing its moisture content. In rotary driers, operated with the same heating medium, this condensation of moisture takes place at the lower end of the drier and the moisture-laden gases passing along the drier prevent successful operation. At present, such installations usually include a primary source of heat, either for the drier or the gases to be passed through it, and this is evidently a wasteful and expensive adjunct.

I have found that these unsatisfactory results, following utilization of waste gases for drying purposes, are brought about by failure to carry on the process under conditions which cause a proper balance of vapor tensions within the drying chamber, and because this factor is neglected, it is only by the merest chance that the use of waste gases is accompanied by any degree of success. According to my invention, however, I employ waste gases of combustion for the drying medium, which are normally of relatively high sensible heat and of high water vapor or steam content, but with these gases I mix another gas, such as air, of a lower moisture content. The mixture of these gases is brought about under such regulation that a portion of the sensible heat of the waste gases is utilized to increase the temperature of the second gas, and the resulting mixture is one which has a relatively low moisture content. This mixture, at the desired temperature, is passed through the materials to be dried and it causes an evaporation of the entrained moisture therein under substantially uniform conditions of temperature.

Waste gases of combustion, I have found to be very inefficient for drying when used without such admixture, and this is especially true when the materials to be dried are combustible. Such waste gases normally contain moisture at such vapor tension and the sensible heat is such that the heat units in the gases cannot be used for evaporating the moisture content of the materials to be dried, but, on the contrary, only serve to raise the temperature of the latter until ignition occurs. Also, under certain conditions the vapor tension of the entrained moisture in the combustible materials may be such that the temperature of the gaseous medium falls to the point that moisture therefrom is deposited in the materials, thus wetting these materials instead of drying them.

I am aware that it has been proposed to utilize waste products of combustion for drying combustible materials, with which quantities of air have been admixed, but in doing so, the purpose of the mixing has been to reduce the temperature of the gaseous products below the ignition point of the combustible to be dried, prior to the admission of these products to the drier. According to the proposed method, no attempt is made to regulate the mixing operation to secure a gaseous product of suitable moisture content, so that the sensible heat of the product can be used for evaporating the entrained moisture in the materials to be dried. This failure to recognize the paramount importance of the regulation of the quantity of moisture present in the drying medium has made the proposed method unsatisfactory, because, as will be presently pointed out, it is the balance of vapor tensions in the drying chamber, which is the controlling factor in successful drying, and not temperature. Since, in the proposed method, the temperature only of the drying medium is regulated, and no attempt is made to secure a medium of proper moisture content, it is only by accident that the proper conditions for drying are set up in the chamber.

The present invention is based on the application of certain physical laws, relating to the action of gases containing varying quantities of water vapor, and a brief discussion of these laws will serve to make clear the manner in which the present process is carried on.

Water vapor cannot exist, under standard conditions, but condenses to liquid at 212° F., if under 760 millimeters of mercury pressure. It exists at lower temperatures than 212° F., but only under partial pressures of fractions of an atmosphere. At a pressure of 1/15 of an atmosphere, when it forms 1/15 of a mixture of gases, it cannot exist uncondensed at a temperature of 100° F.

It is known that, on converting water into steam or vapor under a constant tension of 760 m. m., of mercury, it is necessary to maintain a corresponding temperature of 212° F. at which temperaure the water will be evaporated, and the more B. t. u. supplied the greater the rate of evaporation without increase of temperature.

Should the tension of the water be reduced below 760 m. m. of mercury, the temperature at which the water will be evaporated will reduce accordingly, and the more B. t. u. supplied the greater the rate of evaporation wihout raising the temperature of the water.

In eliminating the moisture from combustible materials, I have taken advantage of these conditions.

I have also taken into consideration in my invention, that moisture is usually retained in materials at a tension far below 760 m. m. of mercury, and, during the process of evaporation, while the tension remains constant, the temperature remains constant, and an increase in the number of heat units supplied only tends to increase the rate of evaporation of the moisture and does not raise the temperature of the moisture or the material containing the moisture.

When gases which contain moisture under a certain vapor tension pass through material in a drier, which contains moisture under a less tension, then moisture flows from the gas into the material, but if the tension conditions are reversed, moisture will flow from the material to the gas. In the first case, the process is one of condensation, and a liberation of heat occurs at the surface of the solid materials, tending to raise the temperature thereof, while, in the second case, the process is one of evaporation, and the heat of the gases is used for useful work.

According to the methods of the prior art wherein the sensible heat of the gases is used for evaporating moisture in the example above in which the gases contain vapor under 71 m. m. of mercury, these gases will evaporate moisture only in those portions of the material to be dried where the gases are sufficiently high in temperature as to retain moisture in suspension, but as the gases flow through the material, their temperature falls, and eventually reaches a point where moisture is redeposited in these materials. Thus, in that part of the drier where evaporation has taken place, the sensible heat of the gases then serves to raise the temperature of the solid material and, in the case of combustibles, this may eventually reach the ignition point. According to this old method, in order to eliminate moisture, the temperature of the entire mass of the material has to be raised to a temperature which is dangerous when the material to be dried is combustible.

Furthermore, if the drier be operated according to the prior methods so as to maintain a constant temperature in the materials being dried, as, for example, 100° F., and if the waste gases entering the drier have a moisture content under a tension of 71 m. m. of mercury, with the tension of the moisture in the materials to be dried at 50 m. m. of mercury, then it is found that after the material has passed through the drier it contains .7359—.5=.2359 lbs. more moisture than when it entered, for every 12.15 lbs. of waste gases passing through the drier. The earlier attempts, therefore, to use waste gases for drying were unsuccessful, as under the conditions of operation moisture was often added to the materials to be dried instead of being abstracted from them.

In order to make the practice of this invention clear, the following example of the operation of a drier according to my process will be given, these calculations being based on actual operating conditions, although it will be understood that certain of the factors entering into the calculations will vary within wide limits.

According to my process, I may employ as a heating medium waste gases of combustion from another process, such as a boiler furnace, a heating furnace, or the like. Assuming that the waste gases contain moisture under a tension of 71 m. m. of mercury, then to eliminate moisture from a combustible material, wherein such moisture is contained under a vapor tension of 50 m. m. of mercury, I bring about a mixture of the waste gases with another gas, such as air, which contains moisture under a vapor tension of, for example 15 m. m. of mercury, this mixture being in the proportion of 12.15 lbs. of waste gases to 23.25 lbs. of the other gas. In this operation a certain proportion of the sensible heat of the waste gas, for example, 216 B. t. u. of the sensible heat, is used to heat the second gas, while another portion of the sensible heat, for example 695 B. t. u. is used to evaporate the moisture held in the materials to be dried at a tension of 50 m. m. of mercury. The gases mixed in the regulated proportions above given, will serve to maintain a constant and uniform temperature in the materials in the drier, and under proper regulation an increase in the available sensible heat can be utilized to increase the rate of evaporation.

It will be apparent from the above that the purpose in diluting the waste gases with air or another gas is not primarily to reduce the temperature of the mixture, although this result necessarily follows, for as long as the balance of vapor tensions in the drying chamber is maintained, increases in temperature will serve only to accelerate the rate of evaporation, and will not have the effect of transferring heat to the combustible material to the extent that ignition may be brought about in the latter. Furthermore, even though the mixture of air with the waste gases will reduce the temperature of the mixture, then if the vapor tension balance is not maintained; that is, if the vapor tension of the moisture carried by the waste gases is higher than the vapor tension of the moisture in the combustible material, there will still be a transfer of heat to the combustible material and the latter may be ignited.

The balance in vapor tensions above outlined is exemplary of the operation of the process and will serve as a basis upon which the process may be applied in installations in which the factors of operation differ. The relations according to which the final mixture to be used as a drying medium is brought about are derived as follows:

Assuming that the waste gaseous products of combustion which are to be used for drying purposes, are derived from the burning coal of the following analysis:

|  | Per cent. |
|---|---|
| $H_2O$ | 12.24 |
| $C_2H_4$ | 37.60 |
| C | 46.98 |

Then there would be present $.1224 \times 2/18 = .0136$ lbs. hydrogen, and $.1224 \times 16/18 = .1088$ lbs. oxygen, these quantities being derived from the moisture present.

There would also be $.3760 \times 24/28 = .3223$ lbs. carbon, and $.3760 \times 4/28 = .0537$ lbs. hydrogen, the above amounts being derived from the $C_2H_4$. The total hydrogen present from the coal is $.0136 + .0537 = .0673$ lbs. and the total carbon present is $.3223 + .4698 = .7921$ lbs. The total oxygen in the coal is .109.

To unite with the hydrogen present there is required $.0673 \times 16/2 = .5384$ lbs. oxygen, and to unite with or burn the carbon present, there is required $.7921 \times 32/12 = 2.1123$ lbs. oxygen, the total oxygen required for both purposes, thus being $.5384 + 2.1123 = 2.6507$. As the coal contains .109 lbs. oxygen there is required 2.5417 lbs. oxygen to be derived from the air admitted for combustion purposes.

The total amount of water vapor or steam produced from each pound of coal amounts to $.0673 + .5384 = .6057$ lbs. $H_2O$. Also, since air contains approximately 23% by weight of oxygen, the total quantity of air required for combustion will be $$\frac{2.5417}{23} = 11.05$$

lbs. of air, and the nitrogen present in this amount of air is $11.05 - 2.5417 = 8.5083$ lbs. nitrogen gas.

Upon burning one pound of coal of the above analysis there is accordingly produced $CO_2$, 2.9044 lbs.; $H_2O$, .6057 lbs. as water vapor or steam; $N_2$, 8.5083 as nitrogen gas, making a total of 12.0184 lbs. of gaseous products of combustion. At 62° F. and 15 m. m. of mercury pressure, 11.05 lbs. of air will carry $$11.05 \times \frac{.00088}{.0747} = .1302$$

lbs. of water vapor so that the total weight of the products of combustion including the moisture in the air will amount to $12.0184 + .1302 = 12.1486$ lbs. of gas and $H_2O$ vapor. The total amount of water vapor or steam present amounts to $.6057 + .1302 = .7359$ lbs. while the total amount of $CO_2$ and $N_2 = 11.4127$ lbs. This amount of $CO_2 + N_2$ gas carries the .7359 lbs. of water vapor which is derived in part from the air for combustion and in part from the combustion of the hydrogen in the coal. At 100° F. and 50 m. m. of mercury pressure, however, 11.4127 lbs. of $CO_2$ and $N_2$ gas will not carry over .5 lbs. of water vapor, so that under these conditions .2359 lbs. of water will be condensed in the drier for every 12.1486 lbs. of the waste gases that enter it.

If the temperature of the 12.15 lbs. of gases entering the drier be 400° F. and a temperature of 100° F. is to be maintained in the materials in the drier, then a temperature drop of 300° F. takes place, and assuming the specific heat of the gases to be .25 B. t. u. per lb. there are available 12.15×.25×300=911 B. t. u. in sensible heat for every pound of coal burned and delivering waste gases. To eliminate one pound of moisture from the material in the drier will require approximately 1400 B. t. u. so that the 911 B. t. u. available will eliminate about .65 of a pound of moisture.

As the waste gases will add .2359 lbs. of water at 100° F. to the materials to be dried, then .2359×1400=330 B. t. u. are utilized to evaporate this moisture and the difference 911—330=581 B. t. u. are available to raise the temperature of the materials in the drier.

In order to bring about the desired drying according to my process, the following equations are to be solved:

Let X=lbs. of gas at 62° F. to be mixed with 12.15 lbs. of waste gases of combustion which at 15 m. m. of mercury will contain $$\frac{.000881}{.0747} = .01178 \text{ lbs. moisture per pound of gas.}$$

Let $t_2$= the temperature of the resulting mixture.

Assuming then that the waste gases are at a temperature of 400° F. and the mean specific heat of the mixture is .25 B. t. u. per lb.
$$12.1486 \times .25 \times (400 - t_2) = X \times .25 (t_2 - 62°)$$
Solving for $t_2$ and X it is found that $$t_2 = \frac{4859.44 + 62X}{X + 12.1486}$$

$$X = \frac{4859.44 - 12.1486\, t_2}{t_2 - 62}$$

Now in order to maintain a constant temperature of 100° F. in the material as the drier and to carry off the moisture, and assuming that the diluting gas contains .01178 lbs. water vapor per lb. at 15 m. m. of mercury pressure, which enters the drier with 12.1486 lbs. of waste gases and vapor, then X lbs. diluting gas+.01178X=1.01178X lbs. diluting gas and vapor and the total weight of gases entering the drier as the result of the combustion of 1 lb. of coal and as a result of the mixing operation will be $11.4127(CO_2+N_2) + X + .7359 + .01178X = 12.1486 + 1.01178X$—total weight of mixed gases and vapor.

One pound of the mixed gas at 100° F. will carry about .0438 lbs. of water vapor, or $(11.4127 + X) \times .0438 = .5 + .0438X$ total lbs. water vapor carried by the mixed gases, recalling that at 100° F. and 40 m. m. of mercury 11.4127 lbs. $CO_2$ and $N_2$ will not carry more than .5 lbs. of water vapor.

Then as the mixture of gases will carry $.5+.0438X$ lbs. of water vapor and there are present .7359 lbs. of water vapor in the waste gases, and .01178X lbs. of water vapor in the diluting gas, the difference—
$(.5+.0438X) - (.7359+.01178X) =$
$.03202X - .2359$ lbs. of moisture will be eliminated from the material in the drier during the passage of the mixed gases therethrough.

The heat available for evaporating moisture at a constant temperature of 100° F. and at a vapor tension of 50 m. m. will be—

$$(12.1486 + 1.01178X) \times .25(t_2 - 100) =$$

$$(12.1486 + 1.01178X) \times .25\left(\frac{4859.44 + 62X}{X + 12.1486} - 100\right).$$

The heat required to evaporate $(.03202X - .2359)$ lbs. of moisture will be—

$$(.03202X - .2359) \times 1400 = 44.828X - 330.26$$

$$(12.1486 + 1.01178X) \times .25\left(\frac{4859.44 + 62X}{X + 12.1486} - 100\right) = 44.828X - 330.26$$

Solving for X, X=23.25, or for every 12.1486 lbs. of gas and water vapor from the gaseous products of combustion, there must be added 23.25 lbs. of gas at 62° F. and 15 m. m. in order to maintain a constant temperature in the materials to be dried, together with the limitation of moisture therefrom.

Solving for $t_2$ it is found that $t_2=178°$, the temperature of the gases entering the drier.

Then as 23.25 lbs. of the diluting gas at 15 m. m. and 62° F. contains 23.25×.01178= .2738 app. lbs. of moisture, and there is present .7359 water vapor in the waste gases, it follows that there are present in the mixture 11.4127+23.25=34.6627 lbs. of gas in the mixture and .7359+.2738=1.0097 lbs. of vapor.

But at the prevailing conditions, 34.6627 lbs. of gas will carry 1.5062 lbs. of moisture, so that during the passage of the mixture through the drier 1.5062−1.0097=.4965 lbs. of moisture will be eliminated from the materials therein.

To eliminate this amount of moisture will require .4965×1400=695 B. t. u. and the heat available is 35.6724×.25 (178−100)= 695 B. t. u. available.

As we have previously seen, with a temperature drop of 300° in the waste gases of combustion 911 B. t. u. are available—, so that 911−695 B. t. u.=216 B. t. u. are available for raising the temperature of the diluting gas.

It will be apparent from the foregoing description of the process and the example of the calculations by which the regulation of vapor tensions in the drier is brought about, that combustible materials can be dried solely by waste gases in an economical and safe manner, provided the proper conditions are maintained in the drier. It will also be clear that this process is by no means limited to the use of waste products as a heating medium, since the hot gases may be supplied directly from a furnace designed solely for that purpose, or from any other source. For purposes of economy, both in operation and construction, the use of gases of combustion from other processes, which have heretofore been allowed to go to waste, is preferred. It is also evident that this process is by no means limited in application to any specific form of drier, and one or several driers may be operated at the same time. The number of driers will depend on the capacity required, and also on the volume and temperature of the waste gases available.

In the accompanying drawings, there is illustrated one typical installation in which this process may be carried on, and in these drawings,—

Fig. 3 is enlarged, sectional, detail view of the air mixing device and its related apparatus.

Fig. 4 is a sectional plan view taken at line A—A of Fig. 3.

Fig. 5 is a transverse sectional view taken at line B—B of Fig. 3.

Fig. 6 is an inverted plan view of the air mixing device looking upwardly through the air-valve openings.

Fig. 7 is a cross-sectional view of a detail of the air inlet and controlling valve.

Fig. 8 is a longitudinal section of the air-valve showing the regulating and indicating means.

Figure 2:
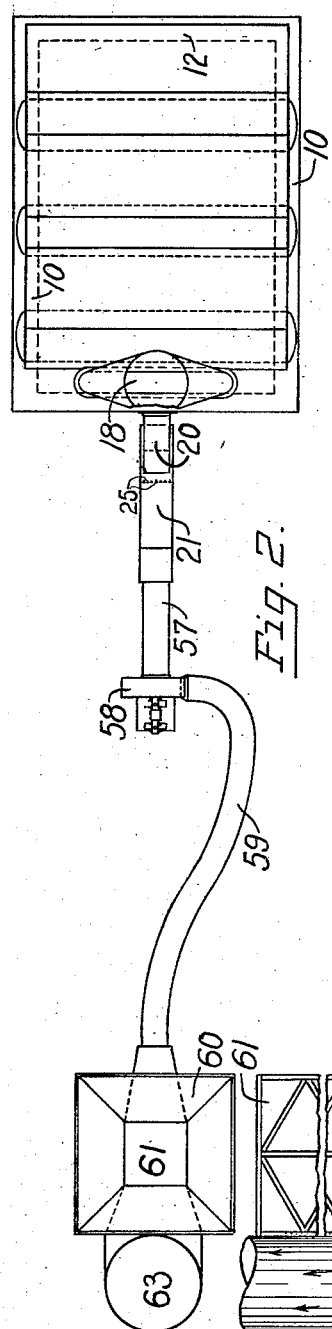
Fig. 2 is a plan view of the assembly shown in Fig. 1.
Figure 1:
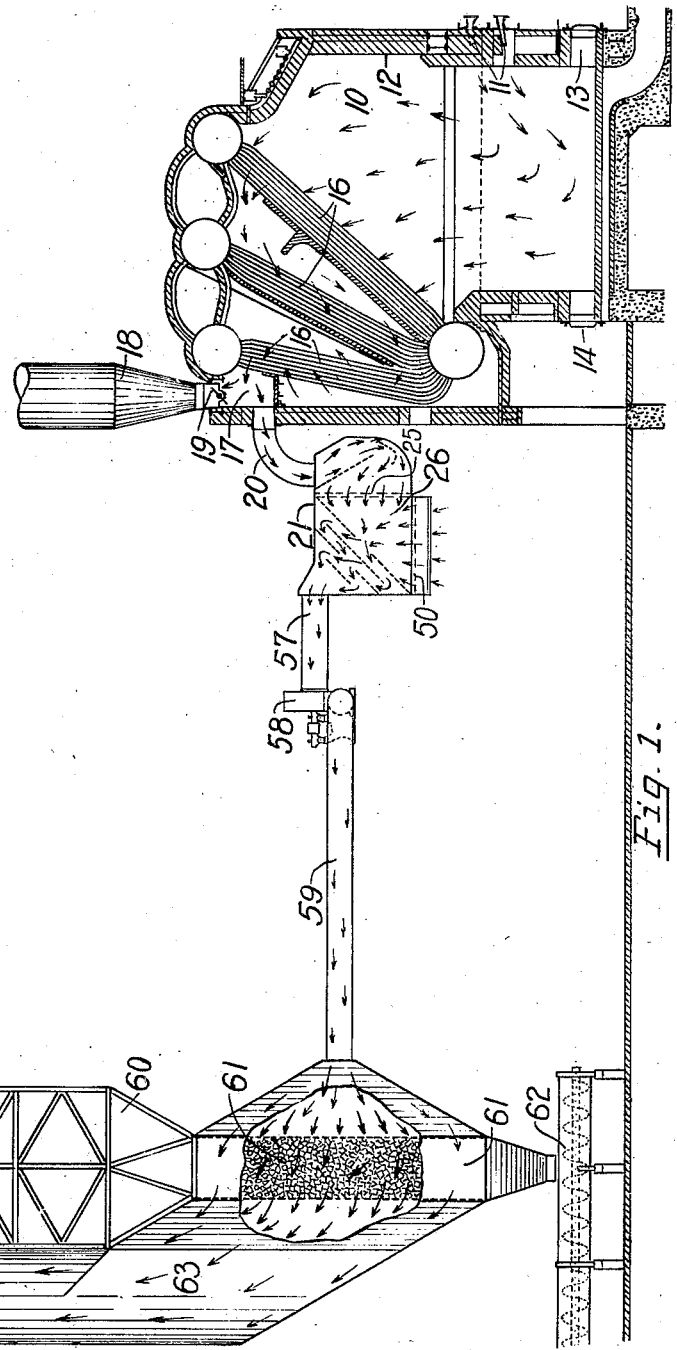
Fig. 1 is a diagrammatic view partly in section showing one form of apparatus or system for carrying out my process.

Referring particularly to Figs. 1 and 2, a boiler furnace, 10, is shown by way of illustration as a means for carrying out a primary process, the waste gaseous products of which may be utilized for carrying out my process with economy.

A mixture of pulverized fuel and primary air is admitted to the furnace through burners 11, positioned in the front wall 12. Secondary combustion air is admitted through suitable dampers, such as those in the clean-out doors 13, 14.

Combustion is completed within the chamber 15 and the hot, gaseous products of combustion are drawn through the boiler and around the baffles as clearly indicated by the path of the arrows. When the gases have reached the out-let flue 17, they have cooled considerably and contain a quantity of moisture obtained from that carried by the fuel, the combustion air and from boiler leakage. The moisture is carried at a relatively high vapor tension.

From the out-let flue 17, the gases may pass to the stack 18 and thence to the atmosphere. A damper of suitable construction is shown at 19 and serves to divert any or all of the waste gases into a flue 20, having normally the same cross-sectional area as the stack-flue.

A mixing device for the hot waste gases, in this instance air, is shown on an enlarged scale in Fig. 3 and is indicated generally at 21, but it is to be understood that any suitable air and flue-gas mixing device may be substituted for this purpose.

The waste gases entering the mixing device pass downwardly past a baffle 22 and are divided by a second deflecting baffle 23 which directs a portion of the gas horizontally, the remainder of the gases passing beyond the baffle 23 and are deflected by the curved wall 24 of the mixing chamber. A plurality of V shaped, perpendicular members 25 serve to direct the hot gases into the central chamber 26 in parallel, vertical paths.

Air is admitted to the chamber 26 through an air-valve 27, shown in detail in Figs. 7 and 8.

Depending from the mixing chamber 26 is a smaller chamber bounded by side walls 28, 29, to which walls is secured a bottom plate 30, which is provided with a plurality of slots or openings 31, through which entering air is admitted and controlled by a movable plate 32 which forms the complementary member of the inlet valve. The plate 32 is provided with a plurality of slots 33, which slots are in staggered relation to and half the width of the slots 31 in the lower plate 30.

Posts 34, secured to the plate 32 are adapted to slide in tubular members 35 which serve as guides for the vertical movement of the upper plate.

Suitably supported in bearings 36, 37 is a shaft 38, to which is secured centrally, a cam 39. Two pillars, 40, 41 connected at the top by a cross member 42 are secured to the movable plate, the cross member 42 resting upon and cooperating with the cam 39. An abutment plate 43 is secured to the movable plate 32 and cooperates with the cam 39 to insure downward movement of the plate if the latter fails to fall by gravity, when the cam shaft 38 is rotated to its closed position.

Secured to one end of the shaft 38 is an index 44 which cooperates with the scale 45 secured to the wall 28. A spring pressed handle 46 passes through an aperture in the index and serves as a means to rotate the index 44 and the shaft 38. The inner end of the handle 46 is reduced as as 47 and engages, as a detent, one of a plurality of apertures 48 formed in the scale 45, to lock the cam shaft 38 in any desired position.

With particular reference to Fig. 8, it will be observed that when the index and shaft 38 are in the left, lowermost position, the movable plate 32 is forced against the fixed plate 30, preventing the admission of air. Rotation of the shaft to the opposite position moves the plate 32 to provide a maximum opening, the space between the plates being one-half of the width of the openings 33 or one-quarter the width of the openings 31, thus insuring an even distribution of entering air, the amount of which may be regulated accurately.

As shown in Fig. 7, a plurality of horizontally disposed, V shaped members 50, similar in construction and function to the members 25, serve to direct the air upwardly in parallel paths through openings 51 in staggered relation to the openings between the members 25, whereby the entering air is evenly distributed between the layers of hot gases.

To further insure a complete mixture of the hot gases and air, an angularly positioned baffle 52, shown in Fig. 3, is provided with a central aperture 53, through which the mixed gases are directed against a second baffle 54, and thence diverted by the latter and other baffles 55 and 56. The separation between the baffles and the openings through them are so balanced that the mixed gases are equally divided during their passage to insure complete mixture.

The gaseous mixture is drawn through the mixing device through a flue 57 by means of a suitable fan 58 which discharges into a flue 59. The fan further serves to complete the mixture of the two gases.

The flue 59 terminates in a drier indicated at 60 and the mixed gases are there forced through the combustible materials to be dried, the position of which is shown at 61 and which are allowed to fall by gravity, the dried materials being conveyed from the drier by any suitable means, such as the screw conveyor 62.

The gases after having evaporated the moisture from the materials, are conveyed to the atmosphere through the stack 63 by the natural draft and the pressure of the fan.

The operation of my process with relation to the specific apparatus shown is as follows: The temperature, moisture content, weight and volume of the flue gases passing from the flue 17 to the stack 18 is determined or may be estimated. The temperature and moisture content of the air or other gas is also determined or estimated, and the percentage and vapor tension of the moisture in the materials being known, a sufficient quantity of the flue gases are diverted by means of the damper 19 into the flue 20 from which they are drawn into the air mixing device. Then, in accordance with the general statement and theory of operation of my process, as explained hereinbefore, a sufficient quantity of air is admitted through the valve 27 at the bottom of the mixing chamber 21, to provide a mixed gas heated by the flue gas and carrying moisture at a vapor tension lowered to a point considerably below the vapor tension of the moisture in the materials to be dried, due to the relatively low vapor tension of the moisture carried by the air. The damper 19 and the index 44, which indicates the position of the air valve 27, are so positioned that the proper mixture of gases may be obtained in accordance with tables and equations set forth hereinbefore. The mixed gases are drawn from the mixing device by the fan 58 and are thereby forced through the materials 61 in the drier 60, the exhaust gases being directed to the atmosphere through the stack 63.

It will be understood from the foregoing description that my process is independent of the apparatus shown and described, and that other equivalent apparatus may be substituted in whole or in part to carry out the same process. The relative location of the various elements may be changed, for example, the fan may be positioned on the outlet side of the drier, although it is preferred to employ the fan as an additional mixing device. Other air and gas mixing and controlling devices may be substituted which may be much less elaborate, and the various forms of driers substituted for the waste heat drier shown on the drawings.

In the preferred application of my process in the arts, it is employed as a waste heat method for drying coal, as the difficulties heretofore encountered, such as ignition and saturation of the coal, make it particularly useful for this purpose, but it is apparent that my process may be used to evaporate moisture from other combustible or non-combustible materials through which the gases may be passed in contact with the materials to be dried.

I claim:

1. The process of drying combustible materials, which comprises mixing waste gases of combustion containing moisture at high vapor tension with other gases, and passing the mixed gases through the materials to be dried while so regulating the mixing operation as to maintain a uniformly constant temperature in said materials.

2. The process of drying combustible materials, which comprises mixing waste gases of combustion of relatively high sensible heat and carrying moisture at high vapor tension with other gases of relatively low sensible heat and carrying moisture at low vapor tension, and passing the mixture through the materials to be dried while so regulating the mixing operation as to maintain a uniformly constant temperature in the said materials.

3. The process of drying combustible materials, which comprises mixing waste gases of combustion carrying moisture at high vapor tension and containing sensible heat from the combustion of fuel with other gases, and passing the mixture through the materials to be dried while so regulating the mixing operation that a portion of the sensible heat of the waste gases is used to heat the other gases and another portion of the sensible heat is used to evaporate moisture in the materials to be dried.

4. The process of drying combustible material, which comprises mixing waste gases of combustion carrying moisture at high vapor tension with other gases carrying moisture at low vapor tension, and passing the mixture through the material to be dried while regulating the mixing operation so that the mixed gases have a lower vapor tension than that of the moisture in the materials to be dried.

5. The process of drying combustible material, which comprises utilizing the sensible heat of hot gases of combustion of high moisture content to heat by mixture with a second gas of low moisture content, and passing the mixture through the materials to be dried, the mixing operation being carried on under such conditions that the moisture-carrying capacity of the second-named gas is increased and a portion of the sensible heat of the first gas is made available for the evaporation of the moisture in the material to be dried.

6. The process of drying combustible material, which comprises mixing waste gas of combustion carrying moisture at high vapor tension with another gas carrying moisture at low vapor tension, and passing the mixture through the material to be dried, the mixing operation being carried on under such conditions that the sensible heat of the first gas is utilized to heat the second gas and the low vapor tension of the second gas is utilized to provide a mixed gas of comparatively low vapor tension useful for withdrawing moisture from the materials to be dried.

7. The process of drying combustible materials, which comprises mixing waste gases of combustion of relatively high sensible heat and carrying moisture at high vapor tension with other gases containing moisture at low vapor tension and of relatively low sensible heat, and passing the mixture through the materials to be dried, while so regulating the mixing operation that a portion of the sensible heat of the first gas is utilized to heat the second gas and another portion of the sensible heat is utilized to accelerate the drying operation.

8. The process of drying combustible materials which comprises mixing waste gases of combustion carrying moisture at a vapor tension too high for efficient drying and of relatively high sensible heat, with another gas containing moisture of relatively low vapor tension and of relatively low sensible heat, and passing the mixture through the materials to be dried while regulating the mixing operation to produce a mixture which contains moisture at a much lower vapor tension than the vapor tension of the moisture in the materials to be dried.

9. The process of drying combustible materials, which comprises mixing waste gases of combustion of relatively high sensible heat and containing moisture at a relatively high vapor tension, with other gases of relatively low sensible heat and containing moisture of relatively low vapor tension, and passing the mixture through the materials to be dried, while controlling the mixing operation to provide a mixture such that upon passage through the materials to be dried evaporation of the moisture contained in the materials being dried takes place at a temperature corresponding to the vapor tension of the moisture present in such materials.

10. The process of drying materials which consists of employing gases of combustion of relatively high sensible heat, and containing moisture at relatively high vapor tension, with other gases carrying moisture at relatively low vapor tension and so regulating and controlling the mixture that evaporation takes place, when the mixed gases are passed through the materials, at a temperature corresponding to the vapor tension of the moisture in the materials to be dried.

11. The process of drying materials which consists of employing gas of relatively high sensible heat and containing moisture at relatively high vapor tension, mixing with this gas a second gas of relatively low sensible heat and containing moisture at relatively low vapor tension, regulating and controlling the mixture that evaporation takes place at a temperature corresponding to the vapor tension of the moisture in the materials to be dried and passing the mixed gases through the materials.

12. The process of drying combustible materials which consists of so mixing and regulating gaseous products of combustion from other processes having a relatively high sensible heat and carrying moisture at a high vapor tension, with other gases of relatively low sensible heat and containing moisture at relatively low vapor tension, so controlling the mixing of the gases so as to evaporate moisture from the materials to be dried at a temperature corresponding to the vapor tension of the moisture in the materials to be dried, whereby ignition of the materials to be dried is prevented.

In testimony whereof I affix my signature.

MICHAEL DOLAND JONES.